March 8, 1938.  E. B. CROCKER  2,110,481
VALVE
Filed Nov. 13, 1935  2 Sheets-Sheet 1

Inventor,
Ernest B. Crocker,
by Roberts Cushman & Woodberry
Attys.

March 8, 1938. E. B. CROCKER 2,110,481
VALVE
Filed Nov. 13, 1935    2 Sheets-Sheet 2

Inventor,
Ernest B. Crocker,
by Roberts Cushman & Woodberry
Attys.

Patented Mar. 8, 1938

2,110,481

UNITED STATES PATENT OFFICE 2,110,481

VALVE

Ernest B. Crocker, Stratford, Conn., assignor, by mesne assignments, to Manning, Maxwell & Moore, Incorporated, New York, N. Y., a corporation of New Jersey Application November 13, 1935, Serial No. 49,541

4 Claims. (Cl. 137—53)

This invention pertains to valves, and relates more particularly to an improved valve seat and cooperating valve feather. While the novel construction herein disclosed is of more general utility, it is particularly designed with reference to relief valves intended automatically to open in response to a predetermined fluid pressure and for use in places where the fluid medium is a gas, for example, cool air. For such uses it has been found in practice that a leak-tight contact between the valve seat and feather is difficult to make or maintain since the slightest imperfection in machining parts or the lodgment of dust, lint, scale, or other foreign matter between the valve feather and seat permits leakage of the gaseous fluid.

It has heretofore been proposed to make one of the contact surfaces, that is to say, either the feather or the seat surface, of a yieldable resilient material, for example, rubber, in order to avoid the necessity for extreme accuracy in machining the parts and to compensate for foreign matter which may lodge between the surfaces. However, as heretofore applied, such resilient material has substantial disadvantages. For example, resilient materials (characteristically like rubber) have a tendency to stick to the opposed metal surface under conditions of use, it being apparent that the relief valve may, under some circumstances, remain closed for a long period of time, during all of which the resilient material is held under substantial pressure against the opposing metal surface. Such sticking of the parts introduces an element of uncertainty into the operation of the valve, the reluctance of the valve parts to separate acting, in effect, as an additional but indeterminate load, thus sometimes delaying the opening of the valve beyond the danger point.

Furthermore, the ready yielding of the resilient material, when used for example as a seat surface, in response to the pressure of the feather, varies the shape and effective area of the surface exposed to the fluid pressure, so that the spring calculations based upon the theoretical size of the opening through the seat are not reliable.

On the other hand, it is highly desirable that the relief valve shall pop at a clearly defined pressure and have a predetermined blow-down with a sharp closing action, and that it retain these characteristics throughout a long period of use. The principal object of the present invention is to provide a substantially leakproof relief valve for use in particular with air or other gas and possessing the above-mentioned desirable characteristics.

Other objects are to provide a valve having these desirable characteristics and which, at the same time, is of practical size and dimensions, simple in construction, easy to manufacture, and durable and reliable in operation.

In the accompanying drawings wherein one desirable embodiment of the invention is illustrated by way of example, but without intent thereby to limit the applicability of the principle of the invention, Fig. 1 is a vertical cross-sectional view of a relief valve embodying the present invention;

Fig. 2 is a side elevation showing the valve feather removed from the valve casing;

Fig. 2ª is a fragmentary elevation, partly in vertical section, showing details of the guide portion of the valve feather;

Fig. 2ᵇ is a bottom plan view of the top member of the valve feather;

Figure 1:
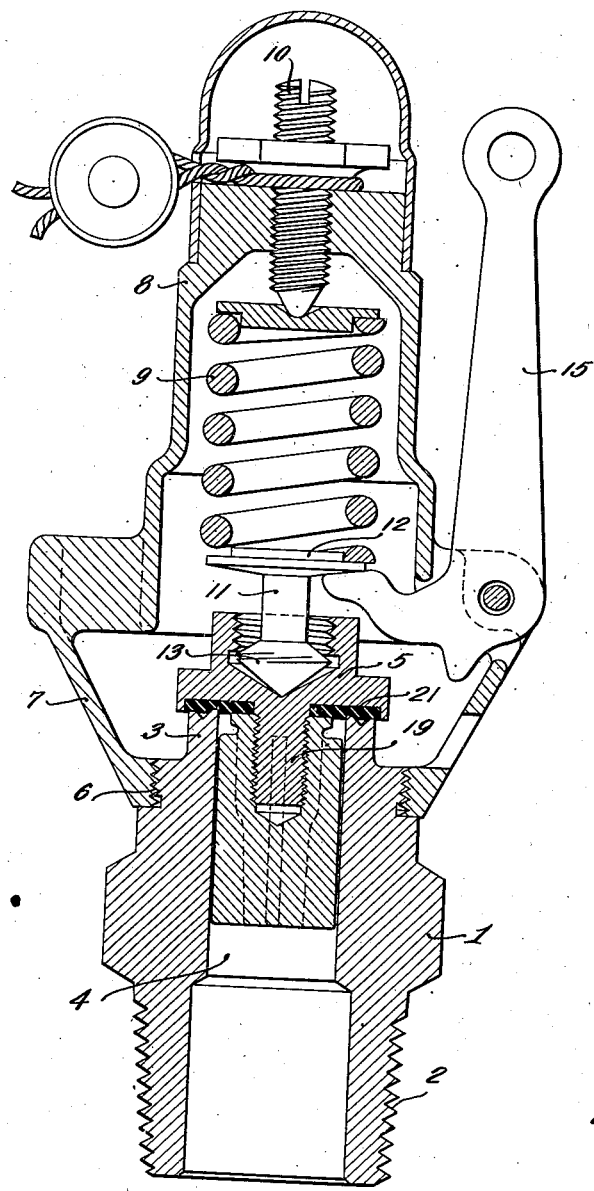

For convenience in description the present invention is herein illustrated as embodied in a valve of the general type disclosed in the patent to Hopkins No. 1,974,274, September 18, 1934, but it is to be understood that the invention is applicable to and useful in valves of specifically different constructions and types.

Referring to the drawings, the numeral 1 designates the base portion of the valve casing, here shown as provided with the screw-threaded nipple 2 by means of which the casing may be fixed in position with respect to a container for pressure fluid. The upper part 3 of the base member 1 is shaped to provide an annular valve seat, hereinafter more fully described, such seat being located at the upper end of and concentric with the passage 4 through which the pressure fluid escapes from the container when the valve is opened. A valve feather 5, hereinafter more fully described, cooperates with the seat to prevent escape of fluid under normal conditions.

Figure 5:
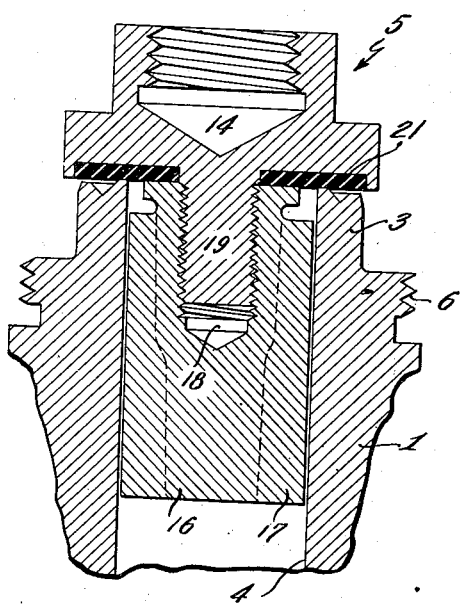
Fig. 5 is a similar fragmentary section, but showing the relative positions of the valve feather and seat at the instant of popping.

The upper portion of the base member 1 is externally screw-threaded at 6 for engagement with the lower part of the bonnet 7. This bonnet 7 comprises the hollow top portion 8 which houses the loading spring 9,—the tension of which may be varied if desired by means of the adjusting screw 10. The spring load is transmitted to the feather 5 by means of the spindle member 11, having the upper flange 12 on which the spring seats and the head 13 which is normally housed in a cavity 14 (Fig. 5) in the upper part of the valve feather. A lever 15, pivoted to the bonnet 7, may be provided, if desired, for relieving the load from the valve feather when it is desired to cause the valve to blow at a pressure lower than the normal blowing pressure, for example, for testing the valve.

Figure 2:
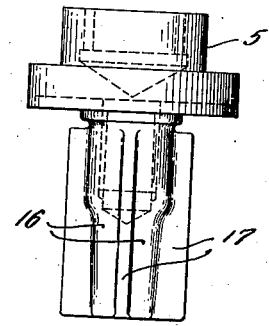
Figure 2A:
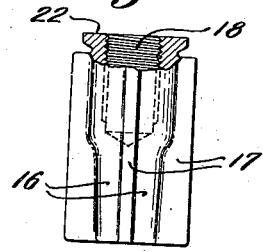
Figure 2B:
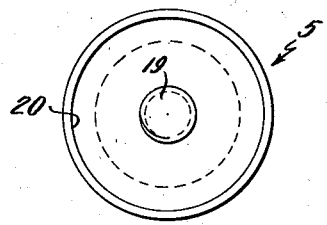

In accordance with a preferred embodiment of the invention, the valve feather comprises a guide portion 16 (Figs. 2, 2ª and 5) which extends down into the fluid-escape passage 4, such guide portion being provided with projecting fins 17 which engage the walls of the passage 4, but which have channels between them for the escape of the pressure fluid. The fins 17 are here shown as four in number, although a greater or lesser number may be employed, the general effect being that the guide portion is fluted. At its upper part, the guide portion 16 is provided with a screw-threaded bore 18, which receives a screw-threaded plug 19 projecting downwardly from the center of the feather 5. The lower surface of the feather 5 is provided with a shallow, annular channel 20 (Fig. 2ᵇ) concentric with the axis of the valve feather and adapted to hold a substantially flat washer 21 consisting of a material which is more or less plastic and/or resilient in nature, for example, vulcanized rubber, synthetic rubber or rubber combined with other materials, for example, fiber so as somewhat to increase its resistance to compression or distortion. The upper end 22 (Fig. 2ª) of the guide portion is substantially flat and when the feather and its guide portion are assembled, the washer 21 is firmly clamped against the surface 22.

Figure 3:
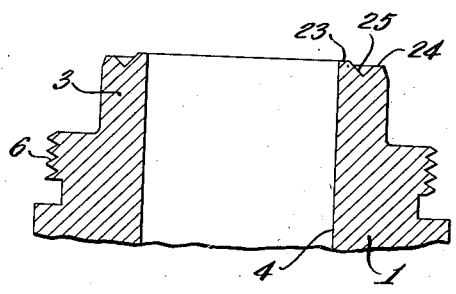
Fig. 3 is a fragmentary vertical section, to larger scale, of the upper portion of the base member of the valve casing, showing details of the improved seat.

The valve seat, in accordance with the present invention, and as here specifically illustrated by way of example, comprises a plurality of spaced concentric annular ribs whose free upper edges actually form the valve seat. As shown, this seat (Fig. 3) comprises the inner surface 23 and the outer surface 24, these surfaces being separated by the annular recess 25. In accordance with the preferred construction, the seat surface 23 is in a plane somewhat higher than the seat surface 24, so that when the valve feather moves toward its normal closed position, the washer 21 engages the seat surface 23 before touching the seat surface 24.

The surfaces 23 and 24 are so designed that when the valve feather rests upon them they will collectively provide sufficient surface area to support the maximum load of the spring at the pressure at which the valve is set, while providing a fluid-tight contact between the resilient washer 21 and the respective seat surfaces. It is obvious that when the valve feather is seated, the inner seat surface 23 will indent the resilient material of the washer 21 more deeply than does the outer seat surface 24.

Figure 6:
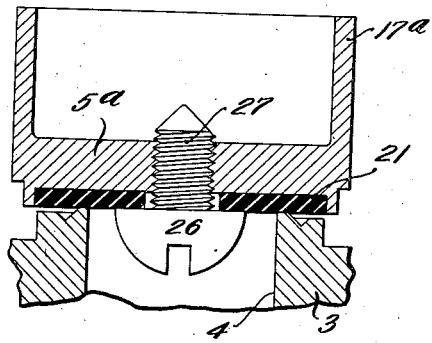
Fig. 6 is a fragmentary section illustrating the invention as applied to a different type of valve, with the feather and the seat in the same relative position as shown in Fig. 5.

In Fig. 6 a slight modification is illustrated, wherein the valve feather 5ª instead of having a guide portion which slides in the fluid passage 4, is provided with a cylindrical upstanding guide flange 17ª. In this instance the washer 21 is clamped against the under surface of the valve feather 5ª by the head 26 of a screw 27 which has screw-threaded engagement with a bore in the feather 5ª.

Figure 4:
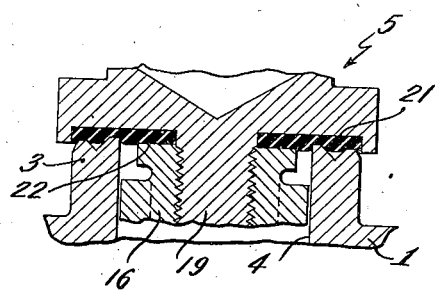
Fig. 4 is a fragmentary vertical section illustrating the relative positions of the parts when the valve feather is fully loaded and resting on the seat.

When the valve is fully loaded, the valve seat surfaces 23 and 24 indent the resilient washer member 21, as illustrated in Fig. 4, and thus provide a fluid-tight closure even for such fluids as air or other gas whose molecules are very small and which tend, when under high pressure, to pass through the most minute crevices. Since the resilient washer is indented at spaced points by the seat surfaces 23 and 24, the material of the washer between these surfaces is crowded together and compressed so that there is less tendency for the resilient material to flow outwardly and away from the contact surface than though but a single seat member were employed.

As the pressure beneath the valve feather rises and approaches the popping point, the compressive stress of the resilient washer finally becomes an effective factor in assisting the fluid pressure in overcoming the load of the spring, and eventually the valve feather retreats sufficiently from the valve seat to free the outer seat surface 24 from contact with the resilient washer. At about this time some leakage commences between the washer and the inner seat surface 23, and such fluid as escapes over the inner rib enters the confined space provided by the groove 25 beneath the overhanging part of the valve feather, and reacts against the larger area of the valve feather to give a huddling chamber effect commonly employed in steam safety valves to insure a sharp opening. In this particular instance this huddling chamber effect is of especial and unique advantage, since if the inner seat surface 23 tends to stick to the resilient washer, the added effective pressure of the fluid in the huddling chamber becomes operative to overcome this sticking and insure a clean and quick separation of the parts.

It is thus assured that although the seat bears against resilient material to prevent leakage, nevertheless, at the popping pressure, the valve will open without danger of sticking,—the huddling chamber action, resulting from the employment of the spaced seat surfaces, assisting in this quick, sharp opening and in providing for an effective blow-down effect.

While but two of the concentric seat surfaces are here illustrated, it is to be understood that a greater number might be employed if desired, and while certain desirable arrangements for holding the resilient material in place are described, it is to be understood that other and equivalent means fall within the scope of the invention.

It is also contemplated that somewhat similar effects might be produced with a reverse arrangement of the parts, that is to say, one in which a substantially flat seat surface of resilient material would coact with the spaced annular rigid engaging surfaces carried by the valve feather. A further equivalent construction falling within the scope of the invention comprises resilient ribs coacting with a substantially flat rigid surface. It is further contemplated that any suitable yielding, plastic or resilient material may be employed in accordance with the requirements of each individual case, and that the invention is not to be limited to any particular dimensions and is considered to include all equivalents of the materials and arrangements herein specifically described.

While, for convenience in description, such terms as "top", "bottom", "upper", "under", etc., have been employed, it is to be understood that these terms are used only in a relative sense, and not as words of limitation.

I claim:

1. A spring-loaded pressure-actuated relief valve designed to pop automatically at a definite predetermined pressure and to have a predetermined blow-down, said valve having a casing, a movable valve feather within the casing, said feather having a resiliently yieldable contact surface, and a valve seat cooperable with the valve feather, said seat comprising a pair of spaced concentric substantially rigid annular ribs whose free edges both engage the resilient contact surface of the feather when the valve is closed, the space between the ribs constituting a huddling chamber, the outer rib being lower than the other, whereby as the pressure beneath the valve feather nears the popping point, pressure fluid leaking past the inner rib into the huddling chamber between the ribs reacts against the overhanging part of the valve feather so as to free the feather and ensure sharp opening.

2. A pressure-actuated automatic relief valve comprising a movable valve feather and yieldable loading means normally operative to hold the feather in valve-closing position, said feather having a resilient and yieldable seat contacting element, and a valve seat cooperable with the valve feather, said seat comprising parts spaced to provide a huddling chamber between them and being so designed and arranged that when the valve is closed one of said parts of the seat indents the resilient contact element of the feather more deeply than does the other of said parts of the seat, whereby as the fluid pressure nearly approaches the predetermined opening pressure the resiliency of the yieldable contact element assists the fluid pressure in overbalancing the loading means and the less deeply indented portion of the contact element separates from the seat before the valve actually opens so that leakage of pressure fluid into the huddling chamber ensures a sharp opening of the valve and complete separation of the feather from the seat.

3. A pressure-actuated relief valve designed to pop automatically at a definite predetermined pressure and to have a predetermined blow-down, said valve having a casing including a base member having a fluid passage terminating at an annular seat concentric with the passage, a valve feather cooperable with the seat to stop the flow of pressure fluid through the passage, said feather comprising a guide member which slides in the fluid passage thereby to center the valve feather relatively to the seat, the lower surface of the feather having a shallow annular concentric channel within which is housed a resilient annular washer, the inner margin of the washer being removably clamped against the lower surface of the feather, the seat surface comprising a pair of annular ribs spaced to provide a huddling chamber between them, the upper edges of the ribs being of such width as collectively to provide sufficient surface area to support the maximum load imposed upon the valve feather, the inner rib being of greater height than the outer rib, and a spring loading the feather so that both ribs normally indent the washer.

4. A pressure-actuated relief valve designed to pop automatically at a definite predetermined pressure and to have a predetermined blow-down, said valve having a casing including a base member having a fluid passage which terminates at an annular seat concentric with the passage, a valve feather cooperable with the seat to stop the flow of pressure fluid through the passage, a guide member coaxial with the feather, means normally uniting said guide member to the feather, the guide member sliding in the fluid passage thereby to center the feather with respect to the seat, the under surface of the feather having a shallow annular channel therein, a washer of rubber-like resiliency seated in said channel with its marginal portion clamped between the under side of the feather and the guide member, the seat surface comprising a pair of annular ribs spaced to provide a huddling chamber between them, the upper edges of the ribs being of such width as collectively to provide sufficient surface area to support the maximum load imposed upon the valve feather without unduly indenting the annular washer, the inner rib being of greater height than the outer rib, and yieldable loading means so loading the feather that both ribs normally slightly indent the washer.

ERNEST B. CROCKER.